(12) United States Patent
Su et al.

(10) Patent No.: US 12,358,641 B2
(45) Date of Patent: Jul. 15, 2025

(54) METHOD AND SYSTEM FOR CONFIGURING FUNCTIONALITIES OF AN AIRCRAFT COCKPIT

(71) Applicant: Airbus Operations (S.A.S.), Toulouse (FR)

(72) Inventors: Sofyan Su, Toulouse (FR); Vincent Souffrant, Toulouse (FR); Frederic Aspro, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 479 days.

(21) Appl. No.: 17/703,043

(22) Filed: Mar. 24, 2022

(65) Prior Publication Data

US 2022/0306312 A1  Sep. 29, 2022

(30) Foreign Application Priority Data

Mar. 29, 2021 (FR) ...................................... 2103220

(51) Int. Cl.
*B64D 43/00* (2006.01)
*G08G 5/21* (2025.01)
*G08G 5/30* (2025.01)

(52) U.S. Cl.
CPC .............. *B64D 43/00* (2013.01); *G08G 5/21* (2025.01); *G08G 5/30* (2025.01)

(58) Field of Classification Search
CPC ...... B64D 43/00; G08G 5/0021; G08G 5/003; G01C 23/00
See application file for complete search history.

(56) References Cited

U.S. PATENT DOCUMENTS

| 5,076,517 | A  | * | 12/1991 | Ferranti ............... | G05D 1/0669 244/236 |
|---|---|---|---|---|---|
| 11,077,958 | B1 | * | 8/2021 | Letsu-Dake ......... | G08G 5/0021 |
| 2012/0075123 | A1 |  | 3/2012 | Keinrath et al. | |
| 2013/0167227 | A1 | * | 6/2013 | Miura .................... | B60K 35/00 726/19 |
| 2014/0214240 | A1 | * | 7/2014 | Funke .................. | G05D 1/0291 701/2 |
| 2015/0066250 | A1 | * | 3/2015 | Garzella ................ | B64D 43/00 701/3 |
| 2015/0307203 | A1 | * | 10/2015 | Litwinowicz ......... | B64C 13/044 701/14 |
| 2015/0346722 | A1 | * | 12/2015 | Herz ....................... | G01S 19/13 701/2 |
| 2017/0015405 | A1 | * | 1/2017 | Chau ...................... | G05B 13/04 |
| 2017/0251501 | A1 | * | 8/2017 | Batsakes ............... | G06F 3/1454 |

(Continued)

OTHER PUBLICATIONS

French Search Report for Application No. 2103220 dated Dec. 9, 2021.

*Primary Examiner* — Anne Marie Antonucci
*Assistant Examiner* — Patrick Daniel Mohl
(74) *Attorney, Agent, or Firm* — KDW Firm PLLC (57) ABSTRACT

A method and system for configuring functionalities of an aircraft cockpit. The configuration system includes at least one processing unit to acquire profiles, to determine at least one combination of functionalities corresponding to the acquired profiles, based on a mapping table, and to activate at least the determined combination of functionalities. The configuration system makes it possible to adapt the functionalities of the cockpit of the aircraft to the profiles.

13 Claims, 5 Drawing Sheets

(56) References Cited

U.S. PATENT DOCUMENTS

| | | | |
|---|---|---|---|
| 2018/0050815 A1* | 2/2018 | Kathirvel | G06T 11/60 |
| 2018/0251209 A1* | 9/2018 | Bilbrey | B64C 1/066 |
| 2019/0188508 A1* | 6/2019 | Zebley | G06V 40/70 |
| 2019/0375514 A1* | 12/2019 | Lampazzi | G09G 5/38 |
| 2020/0027378 A1* | 1/2020 | Castet | G06T 15/04 |
| 2020/0348148 A1* | 11/2020 | B | B64D 43/00 |
| 2021/0394908 A1* | 12/2021 | Klein | B64D 45/00 |
| 2022/0410987 A1* | 12/2022 | Kosaki | B62D 49/0692 |

* cited by examiner

METHOD AND SYSTEM FOR CONFIGURING FUNCTIONALITIES OF AN AIRCRAFT COCKPIT

CROSS-REFERENCE TO RELATED APPLICATION

This application claims priority to French patent application number 2103220 filed on Mar. 29, 2021, the entire disclosure of which is incorporated by reference herein.

TECHNICAL FIELD

The disclosure herein relates to a method and a system for configuring functionalities of an aircraft cockpit.

BACKGROUND

Most airlines have fleets comprising aircraft including different models and/or generations. These differences generally mean that the equipment installed on the aircraft of one and the same fleet differ from one aircraft to another. Note that, even between aircraft of identical model and generation, the equipment can vary. Indeed, it is routine practice to upgrade the equipment of the aircraft, notably the cockpit systems, by updates to the electronics systems or by the implementation of a new version of the cockpits. Thus, on a same aircraft model, cockpits of different generations may be installed, each of them having, for example, different display devices.

The heterogeneous nature of the equipment generates constraints for the airlines. Indeed, a pilot is accredited to pilot an aircraft if he or she has previously received the training necessary to use all the equipment of the aircraft. Consequently, when an airline decides to upgrade any equipment in one of its aircraft, one solution is to impose a same training level on all the pilots likely to pilot the aircraft before applying the upgrade of the equipment. Another solution is to limit the use of the aircraft whose equipment are upgraded only to the pilots that have received the appropriate training.

In the first case, that presupposes that the airlines take the time to train all of the pilots, which delays the upgrading of the equipment of their aircraft. In the second case, it is necessary to ensure an organization that makes it possible to manage suitability between the aircraft and the pilots.

Another type of constraint with which the airlines may be confronted relates to the functionalities linked to the flight missions. In fact, the internal policies of the airlines may, for example, dictate the use of certain functionalities in relation to the nature of the flight missions, notably in the case where the airlines borrow or lend aircraft.

There is consequently a need to find a solution to mitigate these drawbacks.

SUMMARY

An object of the disclosure herein is to mitigate these drawbacks by disclosing a method for configuring functionalities of a cockpit of an aircraft according to at least one profile. The profile or profiles each correspond to a set of characteristic data. The functionalities comprise at least control elements intended to be activated in the cockpit and at least display elements intended to be displayed on a display device of the cockpit.

According to the disclosure herein, the method comprises at least the following steps:

- an acquisition step, implemented by an acquisition module, consisting in or comprising acquiring the profile or profiles;
- a determination step, implemented by a determination module, consisting in or comprising determining at least one combination of functionalities corresponding to the profile or profiles acquired in the acquisition step based on a mapping table mapping characteristic data to functionalities;
- an activation step, implemented by an activation module, consisting in or comprising activating at least the combination of functionalities determined in the determination step.

Thus, by virtue of the disclosure herein, it is possible to adapt the functionalities of the cockpit of the aircraft according to a profile, which makes it possible to render one and the same aircraft able to be piloted, either on different types of missions, or on a same type of mission, by pilots who have different training levels.

In addition, the profile or profiles comprise at least one pilot profile, the pilot profile corresponding to a profile associated with a pilot and the characteristic data of which correspond to skills of the pilot.

Furthermore, the profile or profiles comprise at least one mission profile, the mission profile corresponding to a profile associated with a flight mission, and the characteristic data of which correspond to functionalities necessary to the flight mission. That thus makes it possible to adapt the control elements and the display elements available in the cockpit according to the flight mission. The aircraft can thus be configured to fly a type of flight mission from among different types of flight missions, by guaranteeing that the pilot or pilots have the necessary control elements and display elements available to fly this type of flight mission. The result thereof is that the disclosure herein thus makes it possible to adapt the way the aircraft is piloted according to the flight mission.

Moreover, the profile or profiles comprise at least one pilot profile and at least one mission profile.

Furthermore, in a first embodiment, the acquisition step comprises the following substeps:

- an identification substep, implemented by an identification submodule, consisting in or comprising identifying at least one identification element that can be associated with the profile or profiles;
- a recognition substep, implemented by a recognition submodule, consisting in or comprising recognizing the identification element or elements identified in the identification substep and in mapping it to at least one reference profile stored in a database.

In a second embodiment, the acquisition step consists in or comprises allowing an operator to choose the profile or profiles from among at least one reference profile stored in a database.

In a third embodiment, the acquisition step consists in or comprises receiving a data storage medium containing the profile or profiles to be acquired and in downloading the profile or profiles into a database from the removable data storage medium.

In a fourth embodiment, the acquisition step comprises the following substeps:

- an input substep, implemented by an input submodule, consisting in or comprising allowing an operator to choose desired characteristics from among reference characteristic data stored in a database;

a generation substep, implemented by a generation submodule, consisting in or comprising generating the profile or profiles from the desired characteristic data input in the input substep.

Furthermore, the mapping table maps the profile or profiles to several combinations of functionalities. The determination step additionally comprises the following substeps:
a configuration substep, implemented by a configuration submodule, consisting in or comprising determining a series of combinations of functionalities compatible with the profile or profiles acquired in the acquisition step;
a validation substep, implemented by a validation submodule, consisting in or comprising an operator validating at least one combination of functionalities from among the combinations of the series of combinations of functionalities determined in the configuration substep.

Furthermore, the method also comprises a verification step, implemented by a verification module, consisting in or comprising verifying that at least one functionality activated in the activation step is functioning correctly, that it or they are compatible with avionics systems of the aircraft with which the activated functionality or functionalities are associated and that all of the avionics systems of the aircraft are functioning coherently with one another.

The disclosure herein relates also to a system for configuring functionalities of a cockpit of an aircraft according to at least one profile, the profile or profiles each corresponding to a set of characteristic data, the functionalities comprising at least control elements intended to be activated in the cockpit and at least display elements intended to be displayed on a display device of the cockpit.

The system for configuring functionalities of a cockpit comprises:
an acquisition module configured to acquire the profile or profiles;
a determination module configured to determine at least one combination of functionalities corresponding to the profile or profiles acquired by the acquisition module based on a mapping table mapping characteristic data of functionalities;
an activation module configured to activate at least the combination of functionalities determined by the determination module.

Advantageously, the acquisition module additionally comprises:
an identification submodule configured to identify at least one identification element that can be associated with a profile;
a recognition submodule configured to recognize the identification element or elements identified in the identification substep and to map them to at least one reference profile stored in a database.

Furthermore, the acquisition module is configured to allow an operator to choose the profile or profiles from among at least one reference profile stored in a database.

Moreover, the acquisition module is configured to receive a data storage medium containing the profile or profiles and to download the profile or profiles into a database from the removable data storage medium.

The disclosure herein relates also to an aircraft, in particular a transport aeroplane, comprising a system for configuring functionalities as specified above.

BRIEF DESCRIPTION OF THE DRAWINGS

The attached figures will give a good understanding of how the disclosure herein can be implemented. In these figures, identical references denote similar elements.

DETAILED DESCRIPTION

The system 1 for configuring functionalities 17 of a cockpit 18 of an aircraft AC, in particular a transport aeroplane, according to at least one profile 8, is represented schematically in FIGS. 1 to 4. Hereinafter in the description, the system is called "configuration system 1".

The configuration system 1 can be installed onboard the aircraft AC.

The cockpit 18 of the aircraft AC is provided with various systems that make it possible to form the interface between, on the one hand, at least one pilot and, on the other hand, avionics systems of the aircraft AC such as navigation systems, flight control systems or even communication systems. The cockpit 18 notably has software making it possible to collate data on the systems of the aircraft AC and process them in order to display them on display elements of the cockpit 18. Such software also makes it possible to acquire commands input on control elements of the cockpit 18, to process them and to apply the input commands to the systems of the aircraft AC.

"Functionalities 17" are understood to be all the systems of the cockpit 18 which make it possible to form the interface between the pilots and the avionics systems of the aircraft AC. The functionalities 17 can comprise at least control elements of the aircraft AC, such as a keyboard or a touch screen, and at least display elements such as control screens displaying navigation elements, flight elements or even the state of certain system or engine elements.

Figure 11:
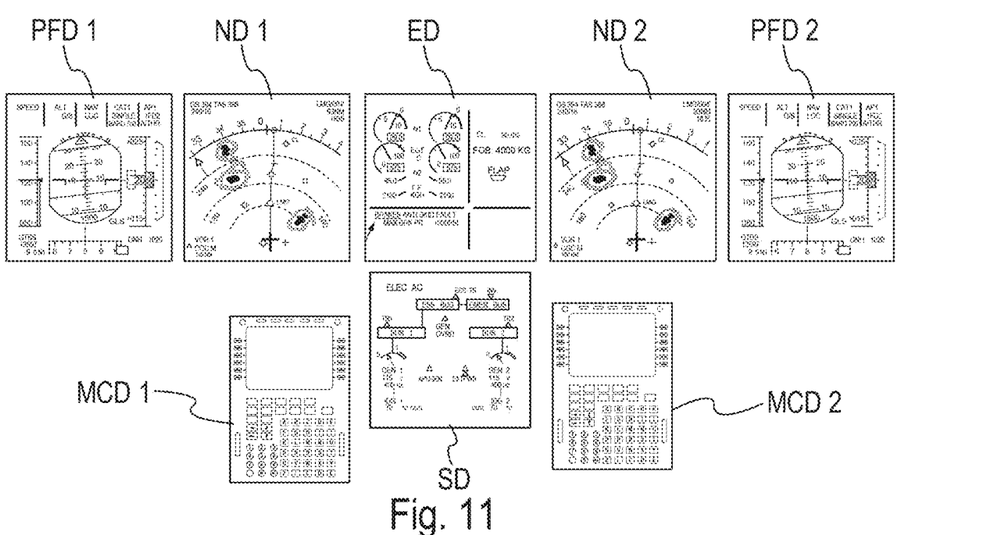
FIG. 11 represents an example of functionalities associated with display devices and control devices of the cockpit of an aircraft.

The functionalities 17 can correspond, as illustrated in FIG. 11, to a combination of different standard control screens, shared or not by the pilots of the aircraft AC, such as main flight screens PFD1 and PFD2 (PFD standing for "Primary Flight Display"), navigation screens ND1 and ND2 (ND standing for "Navigation Display"), an engine control screen ED (ED standing for "Engine Display"), a system display screen SD (SD standing for "System Display"), and a multifunction control and display unit MCD1 and MCD2 (MCD standing for "Multipurpose Control Display").

The purpose of the configuration system 1 is to adapt the functionalities 17 of the cockpit 18 according to at least one profile 8. "Profile 8" is understood to mean a set of characteristic data 16 which, taken independently of or in combination with one another, make it possible to determine at least one combination of functionalities 17. The precise nature of the profile 8 will be defined in more detail hereinafter in the description.

Figure 13A:
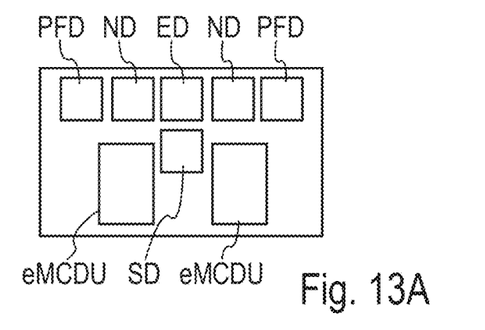
FIGS. 13A and 13B schematically represent two examples of display devices and of control devices of the cockpit of an aircraft with different associated functionalities.
Figure 13B:
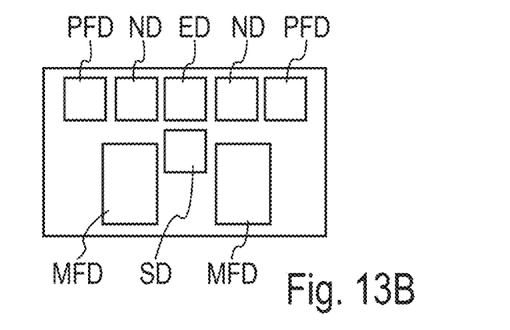

One example of two possible configurations of a functionality 17 of the cockpit 18 can correspond to the activation of a modern version of the functionality 17, or of an earlier version of the functionality 17. Thus, as illustrated in FIGS. 13A and 13B, the configuration system 1 makes it possible to activate a modern version or an earlier version of the screens MCD1 and MCD2.

In this example, the cockpit 18 is equipped with new, entirely touch screens in place of the units MCD1 and MCD2. The pilots who have not received training in the use of this new functionality will therefore be presented with simulated multifunction control and display units eMCDU 1 and eMCDU 2 (eMCDU standing for "Emulated Multi Control and Display Unit") (FIG. 13A), while the pilots who have received the appropriate training will be presented with the multifunction display screens MFD1 and MFD2 (MFD standing for "Multi Function Display") (FIG. 13B).

The configuration system 1 comprises an acquisition module ACQ (ACQ standing for "acquisition module") 2 configured to acquire the profile or profiles 8. This acquisition module 2 makes it possible to supply the configuration system 1 with the profile or profiles 8 according to which the functionalities 17 of the cockpit 18 are wanted to be adapted.

Figure 9:
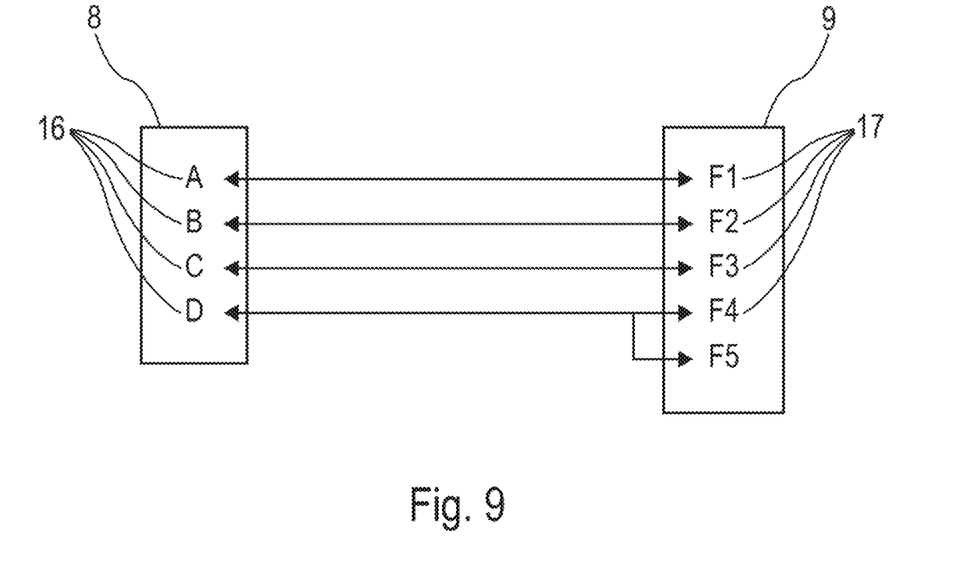
FIG. 9 schematically represents one possible operation of the mapping table.
Figure 10:
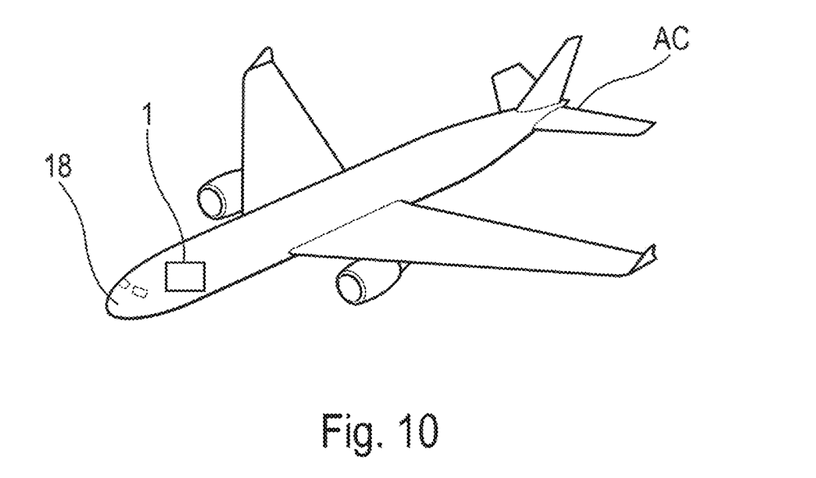
FIG. 10 schematically represents an aircraft comprising a system for configuring functionalities of a cockpit of an aircraft.

The configuration system 1 additionally comprises a determination module DET (DET standing for "determination module") 3 configured to determine at least one combination of functionalities 9 corresponding to the profile or profiles 8 acquired by the acquisition module 2 from a mapping table 7 mapping characteristic data 16 to functionalities 17. FIG. 9 illustrates an example of operation of the mapping table 7. The mapping table 7 can correspond to a database itemizing all the characteristic data 16 which may define a profile 8 and all the functionalities 17 that can be activated in the cockpit 18. The mapping table 7 also comprises a mapping rule linking each characteristic datum 16 to one or more functionalities 17 that can be activated in the cockpit 18.

The configuration system 1 further comprises an activation module ACTI (ACTI standing for "Activation module") 4 configured to activate at least the combination of functionalities 9 determined by the determination module 3.

The profile or profiles 8 can comprise at least one pilot profile. The pilot profile corresponds to a profile associated with a pilot and the characteristic data 16 of which correspond to skills of the pilot. For example, the characteristics data 16 of a pilot profile can be data representing training courses taken by the pilot associated with the pilot profile and his or her level of mastery for each of the training courses. Thus, the pilot profile comprises the information necessary to determine which functionalities 17 the pilot associated with the pilot profile is capable of using. In another example, the characteristic data 16 can also be data representing preferences of the pilot.

The constraints with which the airlines may be confronted can also be linked to the flight missions. In fact, the internal policies of the airlines may dictate the use of certain functionalities 17 with respect to the nature of the flight missions, notably in the case where the airlines borrow or lend aircraft.

Thus, the profile or profiles 8 can also correspond to at least one mission profile. The mission profile corresponds to a profile associated with a flight mission, and the characteristic data of which correspond to functionalities necessary to the flight mission. For example, the characteristic data 16 of a mission profile may be data representing a particular crew configuration such as a "single-pilot" configuration (that is to say with a single pilot) or an "asymmetrical" configuration (that is to say with a crew whose members do not have the same level of training). The characteristic data 16 of the mission profile may also be data representing constraints linked to an internal regulation of an airline demanding or denying the activation of certain functionalities 17 in certain conditions.

In a particular case associating the abovementioned two possibilities, the profile or profiles 8 may also comprise at least one pilot profile and at least one mission profile. Such an association notably makes it possible to obtain a combination of functionalities 9 satisfying both constraints of the flight mission associated with the mission profile and limitations or preferences of the pilot associated with the pilot profile.

Figure 1:
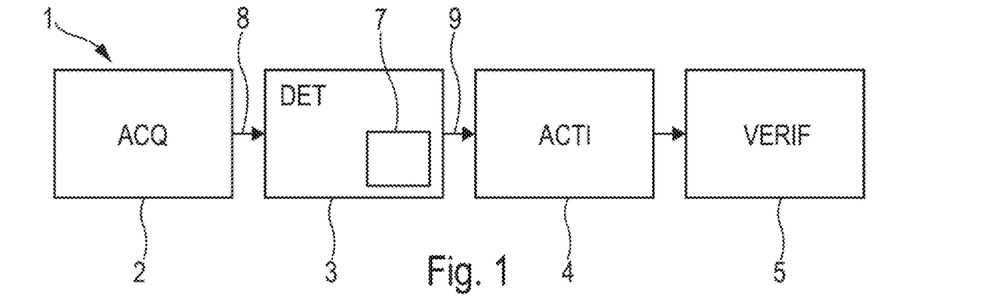
FIG. 1 schematically represents an embodiment of the system for configuring functionalities of a cockpit of an aircraft.
Figure 2:
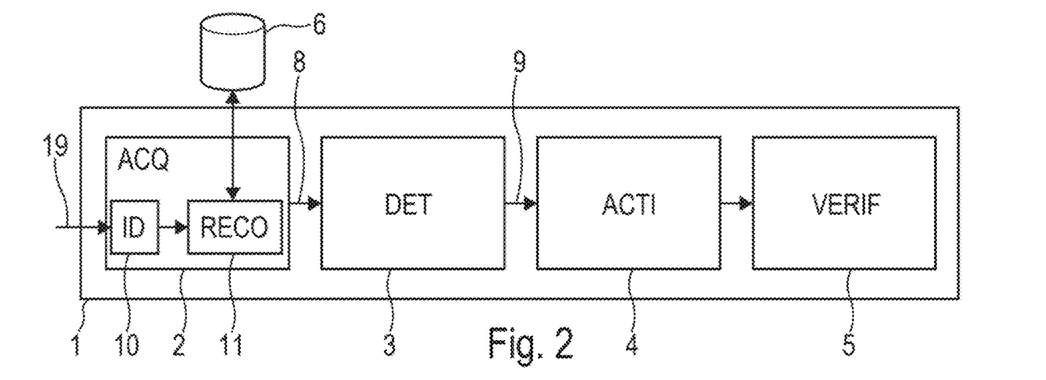
FIG. 2 schematically represents the first embodiment of the system for configuring functionalities of a cockpit of an aircraft.

In a first embodiment, represented schematically in FIG. 2, the acquisition module 2 comprises the following submodules:
an identification submodule ID (ID standing for "identification sub-module") 10 configured to identify at least one identification element 19 that can be associated with the profile or profiles 8;
a recognition submodule RECO (RECO standing for "recognition sub-module") 11 configured to recognize the identification element or elements 19 identified by the identification submodule 10 and to map them to at least one reference profile stored in a database 6.

In such an embodiment, the reference profiles are considered to be previously stored in the database 6. The database 6 can be situated onboard the aircraft AC or in a remote location capable of communicating with the aircraft AC. The reference profile can correspond to a typical pilot or mission profile. It can also correspond directly to a quite particular pilot profile or mission profile. Preferably, each pilot has a pilot profile which corresponds to him or her personally. The set of pilot profiles is stored in the database 6. The stored pilot profiles correspond to the reference profiles.

In this first embodiment, the identification module 10 can, for example, correspond to an optical reader and the identification element 19 to a badge comprising an optical code such as a bar code or a matrix code (QR code, short for "Quick Response code").

In another example of this first embodiment, the identification element 19 can correspond to a personal code associated with the pilot P. This personal code can take the form of a secured ("obfuscated") series of touches or commands to be entered in the control devices of the cockpit 18.

Once decoded, the secured series of touches or commands allows the pilot to be identified by associating him or her with at least one of the reference profiles.

In a second embodiment, the acquisition module 2 is configured to allow an operator to choose the profile or profiles 8 from among at least one reference profile stored in a database 6.

In this second embodiment, it is considered that the reference profile or profiles are previously stored in the database 6. The operator is preferably the pilot. The acquisition module 2 can correspond to a device provided with a display element such as a screen or an input element such as a keyboard or touch pad. The acquisition module 2 thus allows the pilot to choose the profile or profiles 8 that he or she wants to input, for example by searching through a list of reference profiles and by tapping directly on the name of the profile or profiles 8.

In a third embodiment, the acquisition module 2 is configured to receive a data storage medium containing the profile or profiles 8 to be acquired and to download the profile or profiles 8 into a database 6 from the removable data storage medium.

Figure 3:
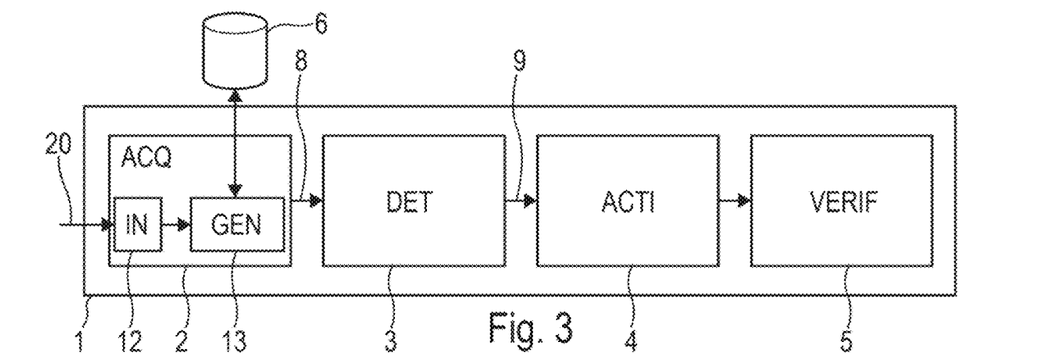
FIG. 3 schematically represents the fourth embodiment of the system for configuring functionalities of a cockpit of an aircraft.
Figure 4:
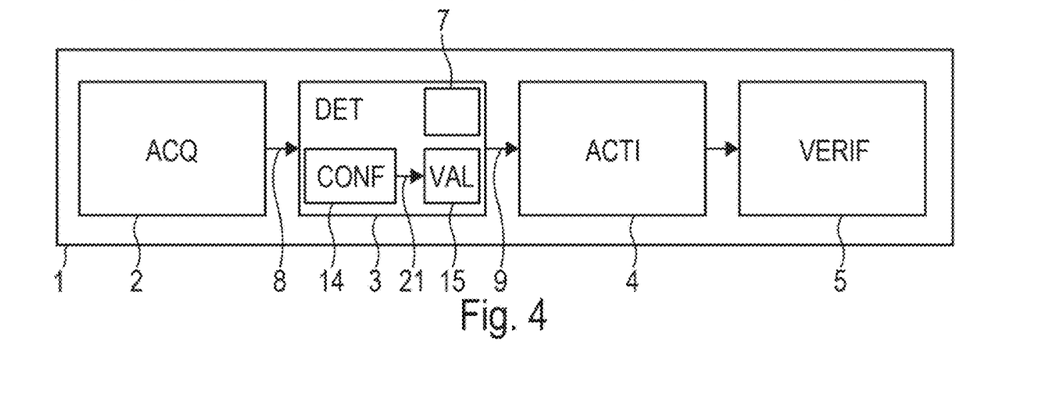
FIG. 4 schematically represents an embodiment of the system for configuring functionalities of a cockpit of an aircraft.

In this third embodiment, the removable data storage medium can correspond to a USB key, to a near field communication device (NFC, standing for "Near Field Communication") or even to a Wi-Fi communication device. Preferably, each pilot has a removable data storage medium which is associated with him or her and which contains at least the pilot profile or profiles which are associated with him or her. The pilot can for example insert his or her USB key into the acquisition module 2 upon embarkation on the aircraft AC, thus downloading his or her profile or profiles 8 into the database 6 and allowing the configuration system 1 to adapt the functionalities 17 of the cockpit 18 according to this profile or these profiles 8. In a fourth embodiment, represented schematically in FIG. 3, the acquisition module 2 comprises the following submodules:

- an input submodule IN (IN standing for "input submodule") 12, configured to allow an operator to choose desired characteristic data 20 from among the reference characteristic data stored in a database 6;
- a generation submodule GEN (GEN standing for "generation sub-module") 13, configured to generate the profile or profiles 8 from the desired characteristic data 20 input by the input submodule 12.

In this fourth embodiment, it is considered that the reference characteristic data are characteristic data previously stored in the database 6. The operator is preferably the pilot. The input submodule 12 can correspond to a device provided with a display element such as a screen and an input element such as a keyboard or touch pad. The input submodule 12 thus allows the pilot to choose the desired characteristic data 20 that he or she wants to input, for example by searching through a list of reference characteristic data or by tapping directly on the name of the desired characteristic data 20. The desired characteristic data 20 preferably correspond to the characteristic data 16 that the pilot wants to associate with the profile or profiles 8 that he or she wants to generate.

Furthermore, the generation submodule 13 can correspond to a device configured to receive and process the desired characteristic data 20 input by the operator by the input submodule 12 so as to generate the profile or profiles 8. The generation submodule 13 can notably comprise a generation rule that makes it possible to format the desired characteristic data 20 input, in a particular format such that they correspond to the characteristic data 16 forming the profile or profiles 8 to be generated.

In one embodiment, the mapping table 7 of the determination module 3 maps the profile or profiles 8 acquired by the acquisition module 2 to several combinations of functionalities 9. The determination module 3 then comprises the following submodules:

- a configuration submodule CONF (CONF standing for "configuring sub-module") 14, configured to determine a series of combinations of functionalities 21 compatible with the profile or profiles 8 acquired by the acquisition module 2;
- a validation submodule VAL (VAL standing for "validation sub-module") 15, configured to allow an operator to validate at least one combination of functionalities 9 from among the combinations of the series of combinations of functionalities 21 determined by the configuration submodule 14.

In this embodiment, the operator is preferably the manufacturer of the aircraft or the airline operating the aircraft. The operator can also be the pilot himself or herself if the manufacturer of the aircraft or the airline so decides. The series of combinations of functionalities 21 can correspond to several display options of the control screens of the cockpit 18. The operator has, for example, the possibility of choosing which control screens he or she wants to display on the display devices of the cockpit 18 and to which locations he or she wants to assign each control screen.

Figure 12:
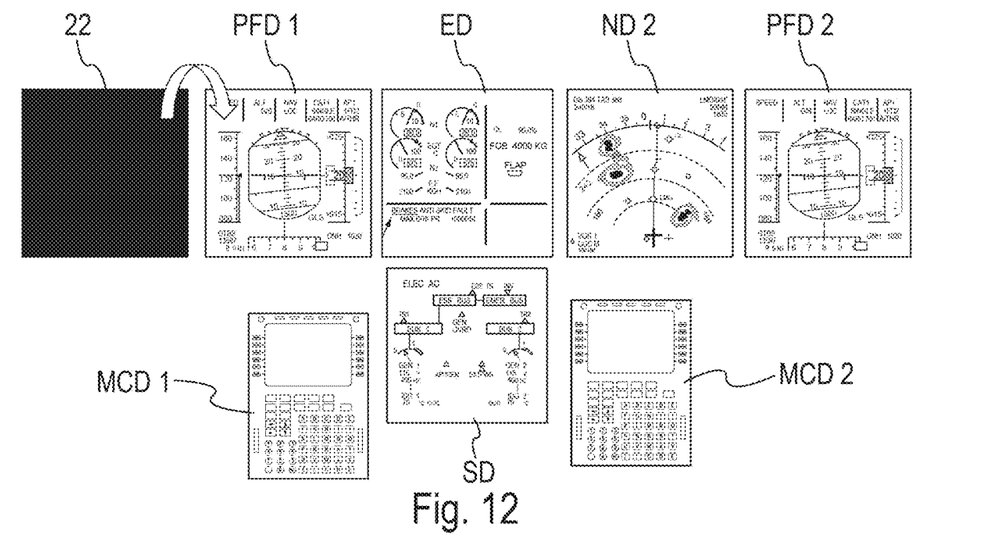
FIG. 12 represents another example of functionalities associated with display devices and control devices of the cockpit of an aircraft.

In a variant of this embodiment, illustrated in FIG. 12, the configuration system 1 allows the operator to reassign at least one functionality 17. In fact, in the case where a device of the cockpit 18 fails, the activation module 4 is also configured to detect at least one failing device 22 and allow the operator to adjust the combination of functionalities 9 to be activated. As illustrated in FIG. 12, the operator can, for example, decide to reassign the display screen PFD1, which was initially assigned to the failing device 22, to another available device in the cockpit 18.

In this variant of the embodiment, the activation module 4 can comprise a reassignment rule which, when a failing device is detected, demands reassigning the functionality 17, initially assigned to the failing device, to another device. Conversely, this reassignment rule can define the functionalities 17 as essential functionalities and deny any reassignment which would deactivate the essential functionality.

In a particular embodiment, the configuration system 1 further comprises a verification module VERIF (VERIF standing for "verification module") 5, configured to verify that at least one functionality 17 activated by the activation module 4 is functioning correctly. The verification module 5 is configured to verify also that this functionality or these functionalities 17 activated are compatible with the avionics systems of the aircraft AC with which the activated functionality or functionalities 17 are associated. A functionality 17 and an avionics system are considered compatible with one another when they are each in a mode of operation allowing them to function correctly with one another. Furthermore, the verification module 5 is configured to verify that all of the avionics systems of the aircraft AC are functioning coherently with one another.

The verification module 5 can comprise a display and control device allowing an operator to act in the case where a compatibility or coherence problem as described above is detected. For example, the verification module 5 can be configured to display information concerning the problem detected. It can also be configured to allow the operator to choose from among several options making it possible to resolve the problem or problems detected, such as automatically determining a new combination of functionalities 21 or manually modifying, case by case, the problematic functionality or functionalities 17 activated.

Preferably, the various modules and submodules are implemented in software form by at least one processing unit of at least one avionics computer of the aircraft.

The disclosure herein relates also to a method 23 for configuring functionalities 17 of the cockpit 18 of the aircraft AC according to the profile or profiles 8. The configuration method 23, schematically illustrated in FIGS. 5 to 8, comprises at least the following steps:

- an acquisition step E1, implemented by the acquisition module 2, consisting in or comprising acquiring the profile or profiles 8;
- a determination step E2, implemented by the determination module 3, consisting in or comprising determining at least one combination of functionalities 9 corresponding to the profile or profiles 8 acquired in the acquisition step E1 from the mapping table 7 mapping characteristic data 16 to functionalities 17;
- an activation step E3, implemented by the activation module 4, consisting in or comprising activating at least the combination of functionalities 9 determined in the determination step E2.

Figure 6:
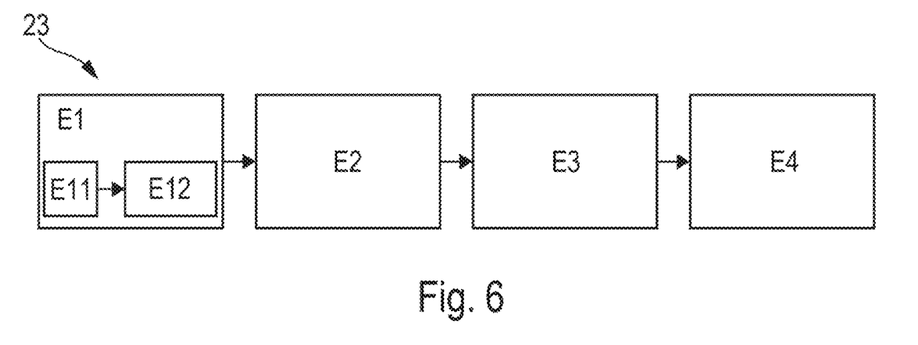
FIG. 6 schematically represents the first embodiment of the method for configuring functionalities of a cockpit of an aircraft.

The acquisition step E1, as illustrated schematically in FIG. 6, can comprise the following substeps:

- an identification substep E11, implemented by the identification submodule 10, consisting in or comprising identifying the identification element or elements 19 that can be associated with the profile or profiles 8;
- a recognition substep E12, implemented by the recognition submodule 11, consisting in or comprising recognizing the identification element or elements 19 identified in the identification substep E11 and in mapping them to at least one reference profile stored in the database.

The acquisition step E1 can also consist in or comprise allowing the operator to choose the profile or profiles 8 from among a list of reference profiles stored in the database 6.

The acquisition step E1 can also consist in or comprise downloading the profile or profiles 8 into the database 6 from the removable data storage medium.

Figure 7:
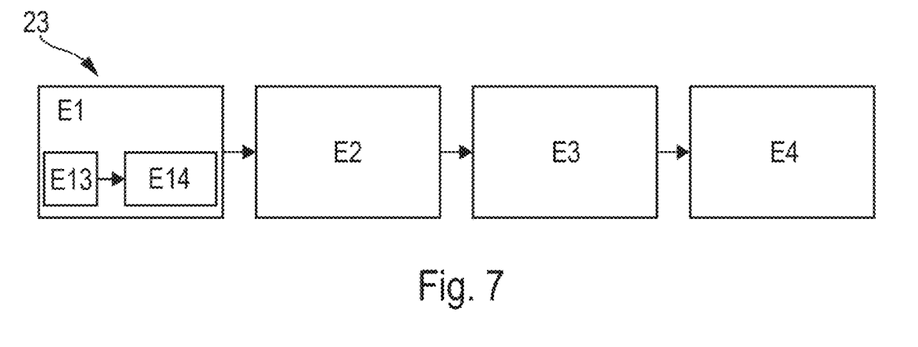
FIG. 7 schematically represents the fourth embodiment of the method for configuring functionalities of a cockpit of an aircraft.

The acquisition step E1, as illustrated schematically in FIG. 7, can comprise the following substeps:

- an input substep E13, implemented by the input submodule 12, consisting in or comprising allowing the operator to input the desired characteristic data 20 from among a list of reference characteristic data stored in the database 6;
- a generation substep E14, implemented by the generation submodule 13, consisting in or comprising generating the profile or profiles 8 from the desired characteristic data 20 input in the input substep E13.

Figure 8:
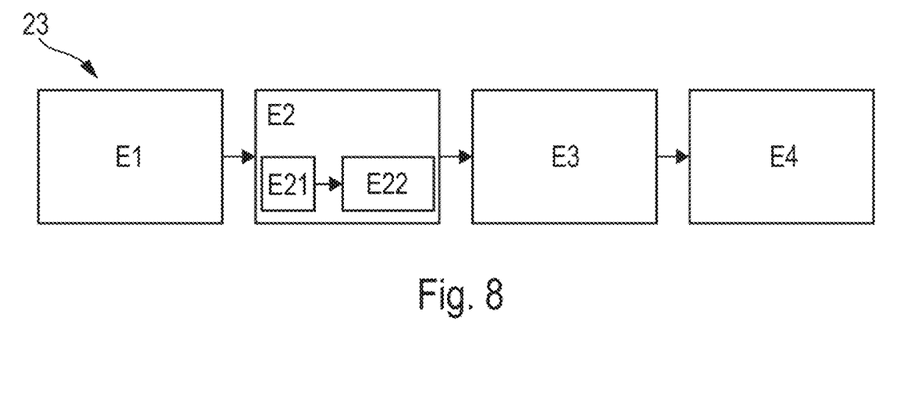
FIG. 8 schematically represents an embodiment of the method for configuring functionalities of a cockpit of an aircraft.

Moreover, as illustrated schematically in FIG. 8, the determination step E2 can comprise the following substeps:

- a configuration substep E21, implemented by the configuration submodule 14, consisting in or comprising determining the series of combinations of functionalities 21 compatible with the profile or profiles 8 acquired in the acquisition step E1;
- a validation substep E22, implemented by the validation submodule 15, consisting in or comprising an operator validating at least one combination of functionalities 9 from among the combinations of the series of combinations of functionalities 21 determined in the configuration substep E21.

Figure 5:
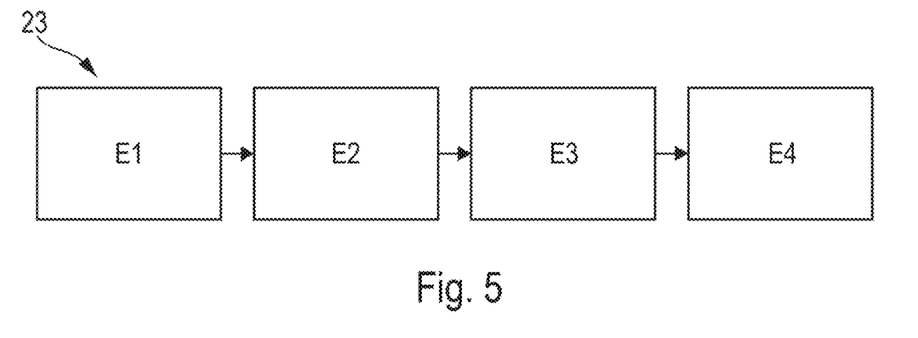
FIG. 5 schematically represents an embodiment of the method for configuring functionalities of a cockpit of an aircraft.

The configuration method 23, as illustrated schematically in FIG. 5, can also comprise a verification step E4, implemented by the verification module 5, consisting in or comprising verifying that at least one functionality 17 activated in the activation step E3 is functioning correctly, that it or they are compatible with avionics systems of the aircraft AC with which the activated functionality or functionalities 17 are associated and that all of the avionics systems of the aircraft AC are functioning coherently with one another.

The subject matter disclosed herein can be implemented in or with software in combination with hardware and/or firmware. For example, the subject matter described herein can be implemented in software executed by a processor or processing unit. In one example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for configuring functionalities of a cockpit of an aircraft according to at least one profile, the profile corresponding to a set of characteristic data, the functionalities comprising at least control elements to be activated in the cockpit and at least display elements to be displayed on a display device of the cockpit, the method comprising at least steps as follows implemented by at least one processing unit of at least one avionics computer of the aircraft:

- an acquisition step comprising acquiring the at least one profile;
- a determination step, comprising determining at least one combination of functionalities corresponding to the at least one profile acquired in the acquisition step, based on a mapping table mapping characteristic data to functionalities;
- an activation step comprising activating at least the combination of functionalities determined in the determination step, and
- wherein the at least one profile comprises at least one pilot profile corresponding to a profile associated with a pilot and characteristic data of which correspond to training courses taken by the pilot; and wherein activating at least the combination of functionalities determined in the determination step comprises activating one of a multifunction display screen or an emulated multifunction control and display unit based on the training courses taken by the pilot, wherein the multifunction display screen is activated if the pilot has received training in the use of the multifunction display screen, and wherein the emulated multifunction control and display unit is activated if the pilot has not received training in the use of the multifunction display screen.

2. The method of claim 1, wherein the acquisition step comprises substeps of:
an identification substep comprising identifying at least one identification element that can be associated with the profile or profiles;
a recognition substep comprising recognizing the identification element identified in the identification substep and mapping the identification element to at least one reference profile stored in a database.

3. The method of claim 1, wherein the acquisition step comprises allowing an operator to choose the profile from among at least one reference profile stored in a database.

4. The method of claim 1, wherein the acquisition step comprises receiving a data storage medium containing the profile to be acquired and in downloading the profile into a database from the data storage medium.

5. The method of claim 1, wherein the acquisition step comprises substeps of:
an input substep comprising allowing an operator to choose desired characteristic data from among reference characteristic data stored in a database; and
a generation substep comprising generating the profile from the desired characteristic data input in the input substep.

6. The method of claim 1, wherein the mapping table maps the profile to combinations of functionalities and wherein the determination step comprises substeps of:
a configuration substep comprising determining a series of combinations of functionalities compatible with the profile acquired in the acquisition step; and
a validation substep comprising an operator validating at least one combination of functionalities from among the combinations of the series of combinations of functionalities determined in the configuration substep.

7. The method of claim 1, comprising a verification step comprising verifying that at least one functionality activated in the activation step is functioning correctly, that it or they are compatible with avionics systems of the aircraft with which the activated functionality or functionalities are associated and that all of the avionics systems of the aircraft are functioning coherently with one another.

8. A system for configuring functionalities of a cockpit of an aircraft according to at least one profile, the profile corresponding to a set of characteristic data, the functionalities comprising at least control elements to be activated in the cockpit and at least display elements to be displayed on a display device of the cockpit, the system comprising at least one processing unit of at least one avionics computer of the aircraft, configured to:
acquire the profile or profiles;
determine at least one combination of functionalities corresponding to the profile or profiles acquired, based on a mapping table mapping characteristic data to functionalities; and
activating at least the determined combination of functionalities, and
wherein the profile or profiles comprise at least one pilot profile corresponding to a profile associated with a pilot and characteristic data of which correspond to training courses taken by the pilot; and
wherein activating at least the determined combination of functionalities comprises activating one of a multifunction display screen or an emulated multifunction control and display unit based on the training courses taken by the pilot, wherein the multifunction display screen is activated if the pilot has received training in the use of the multifunction display screen, and wherein the emulated multifunction control and display unit is activated if the pilot has not received training in the use of the multifunction display screen.

9. The system of claim 8, wherein the at least one processing unit is also configured to:
identify at least one identification element that can be associated with the profile or profiles; and
recognize the identified identification element and map it to at least one reference profile stored in a database.

10. The system of claim 8, wherein the at least one processing unit is further configured to allow an operator to choose the profile or profiles from among at least one reference profile stored in a database.

11. The system of claim 8, wherein the at least one processing unit is further configured to receive a data storage medium containing the profile or profiles and to download the profile or profiles into a database from the data storage medium.

12. An aircraft comprising a configuration system according to claim 8.

13. A system for configuring functionalities of a cockpit of an aircraft according to at least one profile, the profile corresponding to a set of characteristic data, the functionalities comprising at least control elements to be activated in the cockpit, the system comprising at least one processing unit of at least one avionics computer of the aircraft, configured to:
acquire the profile or profiles;
determine at least one combination of functionalities corresponding to the profile or profiles acquired, based on a mapping table mapping characteristic data to functionalities; and
activating at least the determined combination of functionalities;
wherein the profile or profiles comprise at least one mission profile, the mission profile corresponding to a profile associated with a flight mission; and
wherein the characteristic data comprises data representing a crew configuration selected from one of a "single-pilot" configuration in which the combination of functionalities are configured for operation by a single pilot or an "asymmetrical" configuration in which the combination of functionalities are configured for operation by a crew whose members do not have a same level of training.

* * * * *